United States Patent [19]

Moyer

[11] 4,402,240
[45] Sep. 6, 1983

[54] HEAT EXCHANGER RIBBON SLITTING DEVICE AND METHOD

[75] Inventor: Ross A. Moyer, Lafayette, N.Y.

[73] Assignee: Carrier Corporation, Syracuse, N.Y.

[21] Appl. No.: 221,094

[22] Filed: Dec. 29, 1980

[51] Int. Cl.³ .................. B26D 1/62; B26D 3/12
[52] U.S. Cl. .................. 83/343; 83/344; 83/345; 83/37; 83/298; 474/139
[58] Field of Search ............ 83/343, 37, 344, 345, 83/298; 474/139, 205

[56] References Cited

U.S. PATENT DOCUMENTS

| | | | |
|---|---|---|---|
| 2,371,799 | 3/1945 | Brown | 83/343 |
| 2,538,425 | 1/1951 | Nolan | 83/345 |
| 3,730,011 | 5/1973 | Cahill et al. | 474/139 |
| 3,921,428 | 11/1975 | Freres | 83/298 |
| 3,985,054 | 10/1976 | Marino | 83/345 X |
| 4,004,478 | 1/1977 | Morgan | 83/343 |

Primary Examiner—Donald R. Schran
Attorney, Agent, or Firm—Donald F. Daley; Robert P. Hayter

[57] ABSTRACT

A method and apparatus for slitting ribbon stock for use in making fins for a heat exchanger. A pair of slitter wheels are mounted to co-act on separate shafts. One of the shafts is driven by a motor and the other shaft is driven therefrom. Notched pulleys mounted on each shaft and a double sided belt connects the pulleys to maintain the slitter teeth and respective wheels in registration during rotation. A phase shifting device is further provided to allow for initial alignment of the slitter teeth relative to the pulleys.

5 Claims, 5 Drawing Figures

HEAT EXCHANGER RIBBON SLITTING DEVICE AND METHOD

BACKGROUND OF THE INVENTION

1. Field of the Invention

The present invention relates to a fin slitting machine and method. More specifically, the present invention relates to a method and apparatus for maintaining co-acting slitter wheels in registration to enable a sheet of fin stock to be slit prior to being formed into a fin configuration for a heat exchanger.

2. Description of the Prior Art

In a wound fin type heat exchanger wherein a metallic fin is wound helically about a tube to promote heat transfer there are many types of fin configurations which may be utilized. Typically, a solid, smooth surface tube has a projecting fin member extending therefrom to promote heat transfer from fluid flowing through the tube to air or another gas flowing in heat exchange relation with the tube and fin mounted on the exterior surface thereof.

The fin configuration may be one of many known shapes. One of the preferred configurations is to form a fin into a U-shape having a solid center portion which is wound abutting the exterior surface of the tube to promote heat transfer therebetween and having the two leg portions of the U separated from the adjacent leg portions and extending outwardly therefrom. These leg portions form a myriad of tiny spines which upon the fin being wrapped about a tube separate to form a random series of projections defining a heat exchange surface.

This U-shaped fin is formed by slitting a roll of fin stock such that the fin stock mantains a solid center portion and has spaced slits extending outwardly therefrom to the outer edge of the fin stock on both sides. This flat fin stock is then rolled into a U-shaped configuration with the solid center portion forming the base of the U and the slit side portions extending to form the legs thereof. This then U-shaped fin stock is wound about the tube to form the heat exchanger.

Co-acting slitter wheels slit the fin stock to provide the outwardly extending slits from the solid center portion. The slitter wheels each have a series of teeth projecting therefrom which co-act to displace the material in the fin sheet forming the slit therebetween. This slitting is done at relatively high speeds and it is necessary to maintain the slitter teeth in registration with each other as both slitter wheels are rotated at sufficient speed.

The prior art discloses a co-acting slitter wheels mounted such that one is driven in a first direction by a motor. A gear on the shaft of the first slitter wheel interacts with a gear on the shaft of the second slitter wheel to drive the second slitter wheel in the opposite direction. To prevent backlash between the slitter wheels and to maintain the teeth of the slitter wheels in registration, a second motor is applied to the shaft of the second slitter wheel in a direction opposite the direction of rotation of the second slitter wheel to maintain a force thereon. This counteracting force maintains the gears in engagement and allows the slitter teeth to be maintained in registration. Another method similar to that described is the use of a friction brake to maintain a force on the second slitter wheel.

It is necessary to provide a positive means of maintaining registration since the speed of the slitter wheels may be varied in conjunction with the speed that the fin is being wound onto a tube. Hence, the motor driving the first slitter wheel will vary in rotational speed and consequently the second slitter must likewise vary. Without a positive means of maintaining the second slitter wheel in registration it might overrun or underrun the first slitter wheel as the speed of rotation is changed.

It is necessary to maintain the slitter teeth in registration since, should the spacing between the slitter teeth become too large, the slit will not be formed. Should the spacing between the teeth become too small, damage to the slitter wheels may occur.

The present invention incorporates a notched pulley mounted on the shaft of each slitter wheel. A double sided belt having projections co-acting with the notches of each pulley is wound therebetween to rotate the pulleys in opposite directions. The double sided belt acts to maintain the pulleys in registration and allows a small amount of flexibility therebetween to prevent damage to the slitter wheels while maintaining the slitter teeth in the appropriate position.

SUMMARY OF THE INVENTION

An object of the present invention is to provide apparatus for slitting a roll of fin stock.

Another object of the present invention is to provide means for maintaining co-acting slitter wheels in registration.

It is a further object of the present invention to incorporate a phase shifting device together with notched pulleys and a double sided flexible belt to maintain the slitter teeth of co-acting slitter wheels in registration and to provide means for adjusting the phase between the slitter wheel and pulley.

A yet further object of the present invention is to provide an economical, efficient, reliable and long lasting machine for slitting sheet fin stock.

The preceeding objects are achieved according to the preferred embodiment of the invention by providing a stand wherein co-acting slitter wheels are mounted on respective shafts. A motor is provided for driving one of the slitter wheel shafts. A notched pulley is mounted on each shaft and connecting the two notched pulleys is a double sided belt having projections. These projections interact with the notches of the two pulleys to cause a second slitter wheel to rotate in a direction opposite the first slitter wheel and to positively maintain the slitter teeth and the wheels in registration. A phase shift device is attached to one of the pulleys to allow for initial alignment of the slitter wheel relative to the pulley. An idler pulley and an adjustment pulley are additionally provided to complete a closed loop for the flexible belt.

DESCRIPTION OF THE PREFERRED EMBODIMENT

The embodiment of the invention described below is for use in slitting a ribbon fin stock for use as a portion of a heat exchanger. It is to be understood that this invention provides like applicability to other types or uses of fin stock that is required to be slit and to other apparatus and methods wherein slitter teeth are maintained in registration.

Figure 1:
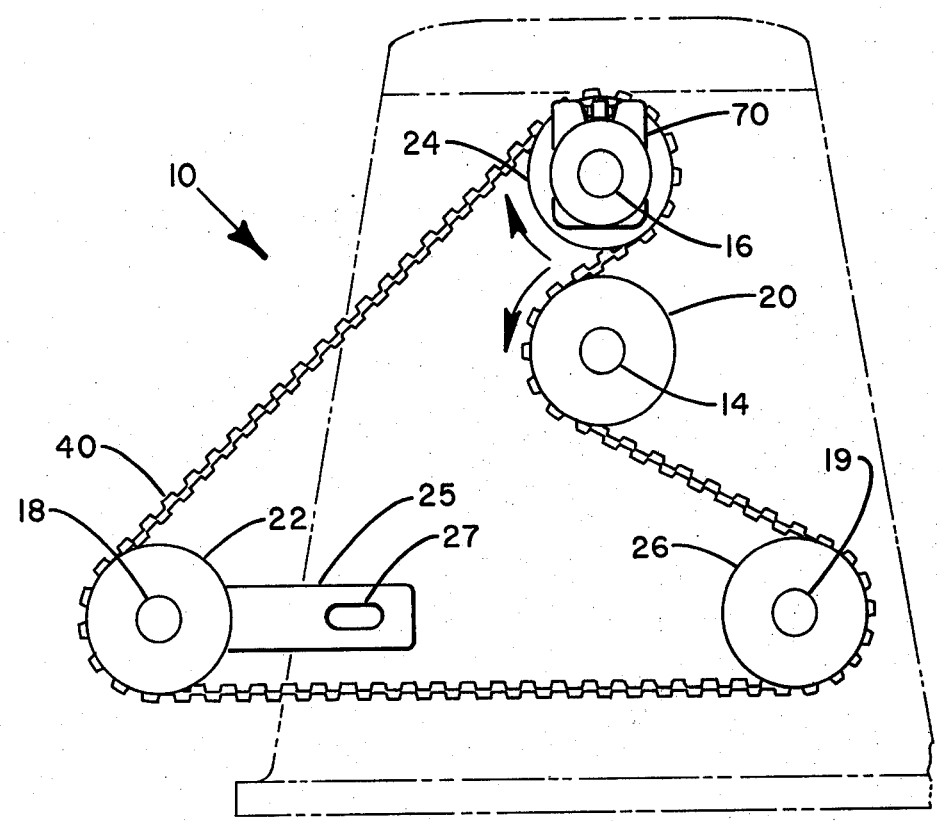
FIG. 1 is an end view of a slitter stand showing the various pulleys and belt.

Referring now to the drawings, it can be seen in FIG. 1 that a slitter stand 10 is provided. On slitter stand 10 are mounted drive shaft 14 and driven shaft 16. Drive pulley 20 is mounted to drive shaft 14 and driven pulley 24 is mounted to driven shaft 16. Double sided belt 40 is shown connecting drive pulley 20 to driven pulley 24 and also engaging adjustable pulley 22 mounted on adjustable pulley shaft 18 and idler pulley 26 mounted on idler shaft 19. The belt forms a closed loop having driven pulley 24, idler pulley 26 and adjustable pulley 22 contained therewithin. Drive pulley 20 is mounted on the exterior side of double sided belt 40. The arrows shown in FIG. 1 indicate the direction of rotation of drive pulley 20 and driven pulley 24. Each of the pulleys has notches therein for the receipt of projections 41 extending from both sides of the exterior of the belt. Adjustable pulley 22 is mounted on pulley bracket 25 having adjustment slot 27. Pulley bracket 25 is secured with adjustable pulley 22 mounted to provide the right tension in belt 40 by securing the bracket to the stand with a bolt through adjustment slot 27.

Figure 4:
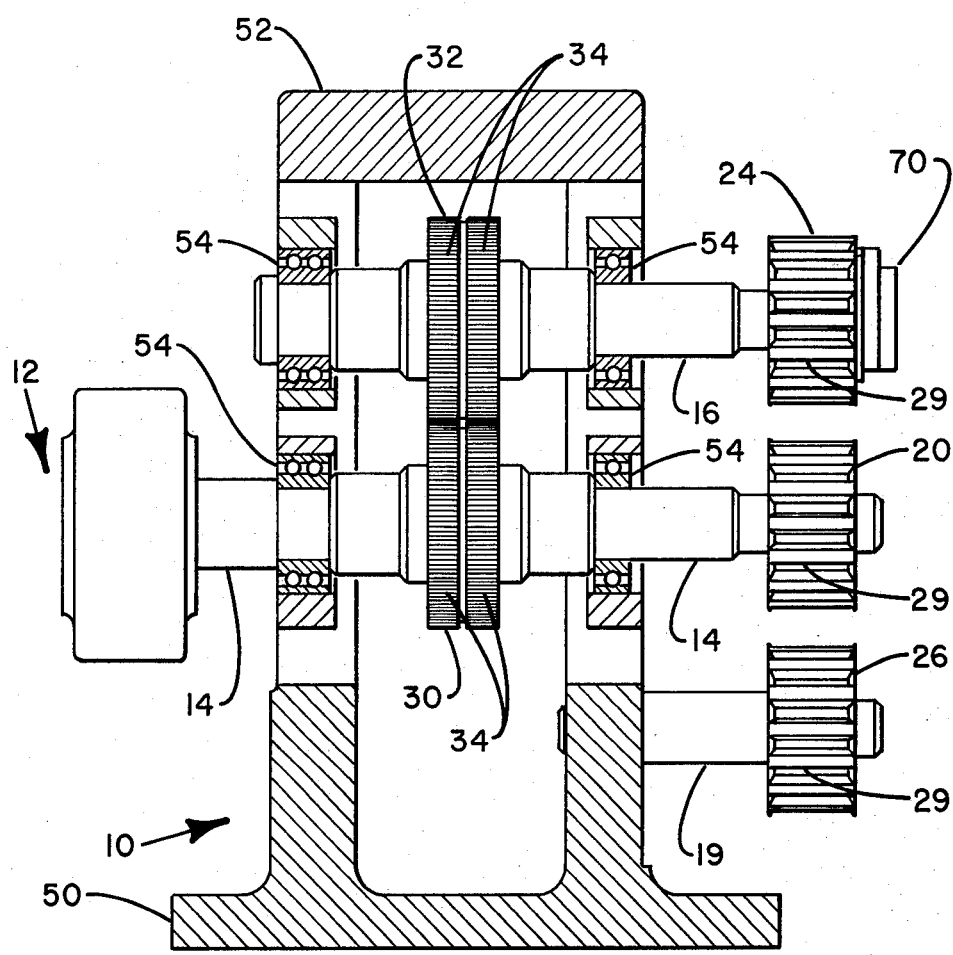
FIG. 4 is a side view of a slitter stand showing the co-acting slitter wheels, motor and pulleys.

Referring now to FIG. 4, there can be seen slitter stand 10 having a base 50 and a cap 52. Drive shaft 14 is shown connected to motor 12, lower slitter wheel 30 and drive pulley 20. Driven shaft 16 has upper slitter wheel 32 and driven pulley 24 mounted thereon. Both shafts are supported by bearings 54 within slitter stand 10. Additionally, pulley 26 can be seen together with drive pulley 20 and driven pulley 24 all in vertical alignment such that double sided belt 40 (not shown) may be interwoven therebetween to drive same. Phase shifter 70, shown in FIGS. 1 and 4, is mounted to shaft 16 and driven pulley 24 to control the relationship therebetween. Notches 29 are shown in the various pulleys for receipt of projections 41 extending from the double sided belt.

Figure 2:
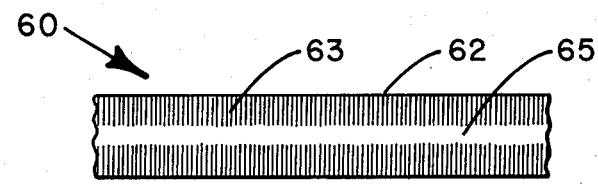
FIG. 2 is a top view of a portion of sheet stock formed into a flat slit ribbon.

FIG. 2 shows a portion of the ribbon fin stock having been slit. Ribbon 60 is shown having a solid center portion 65 and slits 63 extending therefrom to the outward edge of the ribbon. Between slits 63 are fins 62 which form the legs of the U-shaped wound fin after bending.

Figure 3:
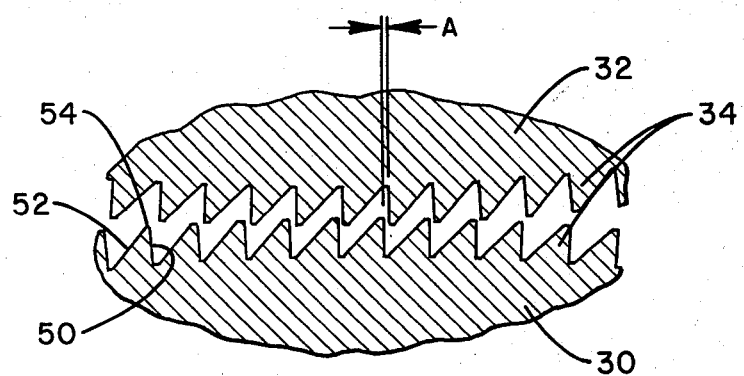
FIG. 3 is a partial sectional view showing how the slitter teeth of each wheel co-act.

FIG. 3 is an enlarged view showing the interaction of the slitter teeth. Lower slitter wheel 30 and upper slitter wheel 32 are shown each having teeth 34 extending therefrom. Each tooth has a top surface 54, trailing edge 52 and perpendicular edge 50. As the slitter wheels rotate, the teeth enter into registration such that the top surfaces 54 of the teeth from slitter wheel 30 do not contact the top surfaces of the teeth from slitter wheel 32 and such that there is a space designated A between the perpendicular edge 50 of each tooth. The teeth are maintained in registration to provide a minimum space A such that slitting will occur. Additionally, the teeth must be maintained in registration such that top surfaces 54 do not engage each other causing damage to the teeth. The utilization of the double sided flexible belt 40 with projections 41 maintains the respective pulleys in relative position and allows a small amount of flexibility such that the clearance between slitter teeth may be maintained at a minimum with the belt through its flexibility compensating for slitter teeth imperfections. The combination of the belt, the projections extending from the belt and these projections engaging the notches of the pulleys provides the amount of control necessary between the pulleys and shafts to allow the teeth to be maintained in registration.

Figure 5:
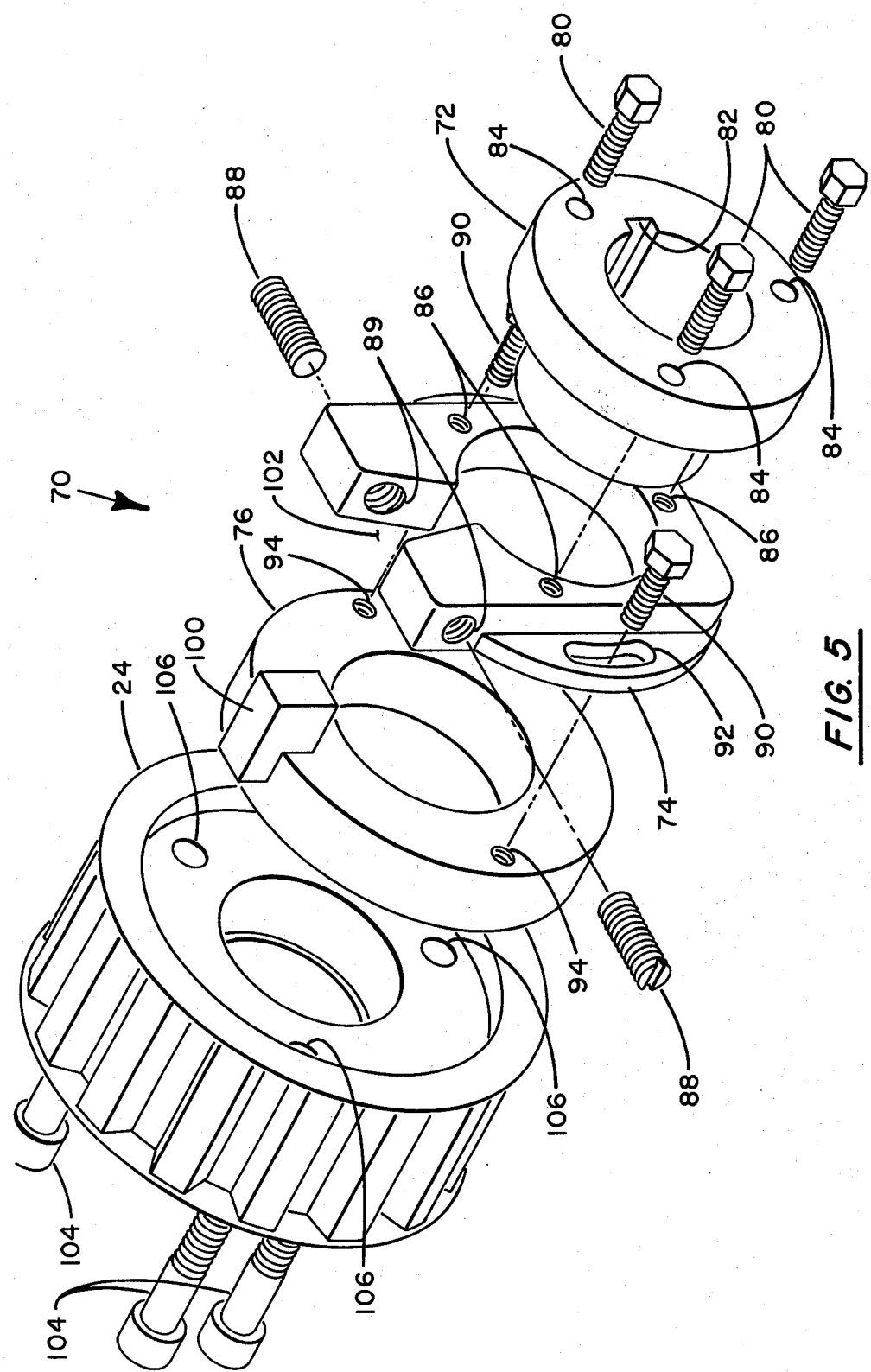
FIG. 5 is an exploded view of the phase shifter attached to the second slitter shaft.

FIG. 5 shows phase shifter 70 such as may be mounted on driven shaft 16. (This phase shifter is commercially available as model AAH Synchro-angle adjusting hub from Browning Manufacturing Division of Emerson Electric Co., Maysville, Ky.) Phase shifter 70 is shown in an exploded view together with driven pulley 24. The specific components of the phase shifter are pulley connector 76, position adjustor 74 and shaft connector 72. These various parts are assembled by bolts 104 being inserted through the back of driven pulley 24 to engage pulley connector 76. These bolts act to maintain the driven pulley and the pulley connector in fixed position with each other. Alignment plug 100 extends from pulley connector 76 and is used as a support from which to rotate the pulley connector and driven pulley relative to the position adjustor and shaft connector.

Position adjustor 74 is secured to pulley connector 76 via bolts 90 extending through adjustment slots 92 into holes 94 in the pulley connector. The position adjuster additionally defines alignment slot 102 into which alignment plug 100 extends. Position adjuster 74 further includes set screw threaded openings 89 through which set screws 88 are inserted. Shaft connector 72 is secured to the position adjustor 74 via bolts 80 extending through holes 84 into openings 86 in the position adjustor. Keyway 82 is shown in the shaft connector 72 for engaging a key extending from driven shaft 16.

The phase shifter is assembled such that the position adjustor 74 and shaft connector 72 are locked together and attached to driven shaft 16. Driven pulley 24 and pulley connector 76 are secured together and connected to flexible belt 40. Bolts 90 are loosened to allow the driven shaft, the position adjustor and shaft connector to be rotated relative to the driven pulley and pulley connector to align the slitter teeth between the upper slitter wheel and the lower slitter wheel. The alignment may be determined by adjusting set screws 88 to rotate the slitter relative to the pulley. After the slitter wheel is located bolts are tightened to secure the shaft in position relative to the driven pulley. Hence, this phase shifter acts to allow relative rotation between the driven pullen and the shaft to align the slitter teeth.

Upon energization of motor 12, drive shaft 14 is rotated which rotates drive pulley 20 in engagement with the flexible belt 40. The flexible belt rotates driven pulley 24 which is connected to driven shaft 16 by phase shifter 70 to rotate the upper slitter wheel 32 in a direction opposite the lower slitter wheel. The flexible belt, having projections extending therefrom which engage the notches of the pulley, maintains the slitter teeth in registration while allowing some small flexibility to absorb shocks built into the system.

The invention has been described in detail with particular reference to the preferred embodiment thereof and it will be understood that variations and modifications can be effected within the spirit and the scope of the invention.

I claim:

1. A mechanism for forming a ribbon of thin sheet stock having spaced slits extending inwardly from an edge of the ribbon for use in a heat exchanger which comprises:
   a first slitter wheel having closely spaced teeth circumferentially spaced about the wheel and being mounted on a first shaft, said teeth defining a top surface located at the radially outermost portion of the wheel and a perpendicular edge which extends radially inwardly from the top surface and partially defines a void between adjacent teeth;
   a second slitter wheel having closely spaced teeth circumferentially spaced about the wheel and being mounted on a second shaft, said teeth defining a top surface located at the radially outermost position of the wheel and a perpendicular edge which extends radially inwardly from the top surface and partially defines a void between adjacent teeth;
   said second slitter wheel coacting with the first slitter wheel when said slitter wheels are rotated with the top surface of a tooth from the first slitter wheel extending into the void between teeth in the second slitter wheel and the top surface of a tooth of the second slitter wheel extending into a void between teeth in the first slitter wheel and the perpendicular surfaces of the teeth of the respective slitter wheels being slightly displaced such that the ribbon is slit as it advances between slitter wheels;
   means for rotatably driving either the first shaft or the second shaft;
   a first pulley mounted to the first shaft;
   a second pulley mounted to the second shaft; and
   a double sided pulley belt connecting the first pulley to the second pulley to rotate the shaft and attached slitter wheel being driven from the shaft connected to the rotating means while maintaining the teeth of the slitter wheels in registration, said belt being sufficiently elastic to stretch slightly to prevent breakage of the teeth should the top surface of a tooth from one slitter wheel engage the top surface of a tooth from the other slitter wheel while being sufficiently inelastic to maintain the desired spacing between perpendicular surfaces of the respective slitter teeth to enable slitting of the ribbon.

2. The apparatus as set forth in claim 1 wherein the first pulley and the second pulley both include notched pulley belt receiving surfaces and wherein the pulley belt has projections extending from both sides thereof, one side engaging the first pulley and the other side engaging the second pulley, the projections of the belt engaging the notches of the pulleys to maintain the slitter wheels in registration.

3. The apparatus as set forth in claim 1 and further comprising:
   an idler pulley;
   an adjustable pulley; and
   wherein the pulley belt is connected to the first pulley, the second pulley, the idler pulley and the adjusting pulley to form a single loop, the first pulley being rotated in a direction opposite the direction the second pulley is rotated.

4. The apparatus as set forth in claim 1 and further including:
   a phase shifter for securing either the first pulley to the first shaft or the second pulley to the second shaft, said phase changer serving to secure the pulley in an adjustable position relative to the shaft to allow the appropriate registration between slitter wheels to be selected.

5. The apparatus as set forth in claim 3 wherein the first shaft with the first pulley, the second shaft with the second pulley, the idler pulley and the adjustable pulley are all mounted as part of a single slitter stand.

* * * * *